United States Patent Office 3,326,928
Patented June 20, 1967

3,326,928
PROCESS FOR PREPARING FLUORINATED COMPOUNDS
John R. Mattson, St. Paul, Minn., assignor to Minnesota Mining and Manufacturing Company, St. Paul, Minn., a corporation of Delaware
No Drawing. Filed Nov. 14, 1966, Ser. No. 593,670
12 Claims. (Cl. 260—289)

This application is a continuation-in-part of Ser. No. 276,201 filed Apr. 29, 1963, now abandoned.

This invention relates to a new and useful process of introducing perfluorocarbon groups into aromatic compounds whereby one or more perfluorocarbon groups become attached to an aromatic nucleus.

The novel process of the invention comprises introducing perfluorocarbon groups directly onto aromatic carbocyclic rings in organic compounds which comprises heating at from about 100° to 225° C. and under free radical conditions a mixture of (1) a compound which contains an aromatic carbocycle with available hydrogen thereon, said carbocycle being selected from the class consisting of
  (a) a benzene ring, the algebraic sum of the Hammett sigma (para) parameters of the substituents on said benzene ring being not greater than about +0.5, and
  (b) a six-membered aromatic ring which is part of a fused ring system, the algebraic sum of the Hammett sigma (para) parameters of the substituents on said ring system being not greater than about +0.8, and (2) a perfluorocarbon sulfonyl halide selected from the class consisting of perfluorocarbon sulfonyl chlorides and perfluorocarbon sulfonyl bromides having 1 to 18 carbon atoms in the molecule until substantial reaction has occurred and recovering the perfluorocarbon-substituted aromatic compound from the reaction mixture.

The process includes the replacement of an available nuclear hydrogen atom of a ring of the aromatic compound by the perfluorocarbon group of a perfluorocarbonsulfonyl halide with the loss through condensation of one molecule each of $SO_2$ and HX wherein X is chloride or bromide. The available hydrogen atom occupies a site which is capable of accepting free radicals.

The process of the invention appears to proceed by a free radical mechanism and is applicable to various substituted aromatic compounds, including fused ring hydrocarbons, as well as to unsubstituted compounds of the same types. These include alkyl-substituted aromatic hydrocarbons, aromatic ethers, polyethers, sulfides, ketones, amines, phenols, naphthols, monohalophenols, polyhydroxybenzenes, mono- and di-halo aromatic hydrocarbons, polyphenyls such as diphenyl and terphenyl, naphthalene chloro silanes having at least one Si-bonded chlorene atom, etc.

The perfluorocarbon groups in the perfluorocarbonsulfonyl halides which are useful in the present process are preferably perfluoroaliphatic groups having open (acyclic) straight or branched chain or cyclic structures (e.g. a perfluorocyclohexyl group having a six membered ring), including a combination of perfluoroalkyl straight chain and perfluorohomocyclic or perfluoroheterocyclic groups. The fluorocarbon group may be bonded to the sulfur atom through either a cyclic or an acyclic carbon atom, and two carbon atoms of the fluorocarbon group may be linked together by an oxygen atom or three carbon atoms may be linked together by a nitrogen atom, since both oxygen and nitrogen provide stable linkages between fluorocarbon groups and do not interfere with the highly stable and inert character of the complete fluorocarbon group or structure, as is shown, for instance, in U.S. Patents Nos. 2,500,388 and 2,616,927. As used herein, "perfluoroaliphatic" therefore includes perfluoro straight or branched chain (i.e. perfluoroalkyl), perfluorocycloaliphatic, and perfluoroalkyl-perfluorocyclo-aliphatic radicals.

Although either the perfluorocarbonsulfonyl chlorides or the perfluorocarbonsulfonyl bromides are acceptable, the chlorides are preferred because of their availability and greater stability.

Among the perfluoroalkanesulfonyl halides useful in the present process are, for example, perfluoromethanesulfonyl chloride, perfluoromethanesulfonyl bromide, perfluorobutane sulfonyl chloride, perfluorohexanesulfonyl bromide, perfluorooctanesulfonyl chloride, perfluorodecanesulfonyl bromide, perfluorododecanesulfonyl chloride, perfluorocyclohexanesulfonyl bromide, perfluoro - (2-methylcyclohexane) sulfonyl chloride, perfluoro-(4-ethylcyclohexane) sulfonyl bromide, perfluoro-(4-isopropylcyclohexane)sulfonyl chloride, perfluoro-(4-secbutylcyclohexane)sulfonyl bromide, perfluoro-4-dodecylcyclohexane)sulfonyl chloride, perfluoro-(4-dodecylcyclohexane) sulfonyl bromide, perfluoro - (cyclohexylmethane)sulfonyl chloride, perfluoro-(2-ethylhexane)sulfonyl bromide, etc.

The perfluorocarbonsulfonyl halides (both chlorides and bromides) can be prepared by reacting the corresponding perfluorocarbonsulfonyl fluoride with an alkaline sulfite in an aqueous medium, preferably in an aqueous medium containing from about 10 to about 50 weight percent of a water soluble, inert organic solvent, to produce a fluorocarbon sulfonic acid salt, and then reacting said salt with the halogen (chlorine or bromine) under aqueous or non-aqueous conditions and recovering the perfluorocarbonsulfonyl halide. The perfluorocarbonsulfonyl fluorides are available from the electrochemical fluorination process as described in U.S. Patent 2,732,398 (which also describes another process for the preparation of the perfluorocarbonsulfonyl chlorides).

As noted previously, the possible substituents on a ring or fused ring system to which a perfluorocarbon group can be added by the process of the invention are determined by their Hammett sigma (para) parameters. The concept of these parameter values is fully explained by H. H. Jaffe in "Chemical Reviews," volume 53 (1953), beginning at page 191, particularly at pages 219–233, wherein are provided numerical values for a large number of substituent radicals. The article also provides the basis on which such numerical values may be derived. The article, and information contained or referred to therein, is included here by reference.

Fused ring aromatic groups (as described in (b) above), have been found to tolerate a higher total sum of Hammett values than benzene rings and still remain reactive within the scope of the process. This is believed to be related to the fact that fused rings are apparently more readily attacked by free radicals than are benzene rings. For the purposes of the invention, various compounds such as indene, phenanthrene, anthracene, pyrene, chrysene, naphthalene, acenaphthalene, fluoroanthene, etc., which consist entirely of fused hydrocarbon rings, are considered to contain unsubstituted fused ring systems.

The process of the invention consists of charging the perfluorocarbonsulfonyl halide and the aromatic compound to a suitable reaction vessel (e.g. a glass or quartz flask fitted with a condenser, trap and drying tube, a stainless steel pressure vessel, etc.). A relatively inert solvent can be added to liquify the reaction mixture, to reduce its viscosity and/or to adjust the reflux temperature thereof. Suitable solvents include liquid or low melting aromatic sulfones, such as diphenyl sulfone, chlorinated aromatic solvents, such as o-dichlorobenzene and trichlorobenzene, etc. A free radical generating catalyst can also be added if desired.

The aromatic compound must be substantially stable under the conditions and temperatures of the reaction. Ordinarily the process is carried out at atmospheric pressure and at from about 100° to 225° C. An additional source of free radicals (such as ultraviolet light or suitable organic peroxide or azo compounds such as benzoylperoxide or azobisisobutyronitrile) and a longer reaction time may be used at the lower temperatures, and the use of pressures up to 2500 p.s.i. or even more may be desirable in some cases. Particularly convenient reaction conditions are atmospheric pressure and the reflux temperature of the particular reaction mixture.

The total reaction time is ordinarily from about 1 to 50 hours. The reaction time for any particular run can be determined conveniently by collecting the sulfur dioxide and hydrogen halide which are liberated. When either about the theoretical amounts of these materials are collected or no more is being collected, the reaction can be considered to be substantially complete. The product is recovered from the reaction mixture using known techniques or combinations thereof, e.g. recrystallization, sublimation, distillation, extraction, filtration, etc.

Highly useful perfluorocarbon-substituted products can be obtained from the process of the invention. These products have structures corresponding to those of the starting compounds rather than being mere polymeric structures or degradation products. Thus, perfluorocarbon-substituted polynuclear aromatic compounds, such as naphthalene and polynuclear dyes can be produced. The process is of practical utility in preparing compounds that have fluorocarbon groups containing one or more carbon atoms. There is apparently no general reduction in yield with increases in the chain length thereof. Perfluoroaliphatic chains containing 3 to 12 carbon atoms are of particular interest because their introduction into aromatic compounds has been found practical and greatly modifies the solubility and surface active properties of the resulting products in a useful manner, owing to the hydrophobic and oleophobic properties of the fluorocarbon "tails" thereby provided.

The perfluorocarbon-substituted products of the process are stable, and in general have greater oxidative and chemical stability than the starting compounds. Solubility in oils, hydrocarbon media and common organic solvents is diminished, particularly when one or more perfluoroaliphatic groups containing 3 or more carbon atoms are incorporated in the molecule so as to obtain a fluorine content of about 50% or higher. Solubility in fluorinated solvents is thereby achieved or enhanced. Products can be obtained which are highly insoluble in water, hydrocarbon, and common organic solvents, but which have significant solubility in fluorocarbon and chlorofluorocarbon type solvents. In addition, certain dyes and pigments can be substituted with perfluorocarbon groups. Dyes and dye-pigments can be made which are compatible with polytetrafluoroethylene and can be successfully employed for dyeing and for printing upon this fluorocarbon polymer, which is incompatible with ordinary dyestuffs.

The following examples illustrate the process of the invention. All parts are by weight unless otherwise specifically stated.

*Example 1*

Acenaphthene, 13 g. (0.1 mole) and 51.8 g. (0.1 mole) of perfluorooctanesulfonyl chloride are charged to a 250 ml. quartz flask equipped with a magnetic stirrer, a vigreaux column, a dry ice trap and a drying tube. The mixture is heated to 60° C. and subjected to irradiation from a Hanovia U.V. lamp. The temperature is raised to 120° C. and is maintained for 21.5 hours. At the end of that time the trap contains 8.4 g. of liquid which is distilled into aqueous sodium hydroxide at room temperature leaving about 1.0 g. of material in the trap. The reaction mixture is a viscous brown mass. It is taken up in ether and transferred to a distillation flask. The ether is removed at atmospheric pressure and the remainder is fractionally distilled. The main fraction distills at 140–152°/1.2 mm. It weighs 22.5 g. and melts at 60–68° C.

Infrared and NMR spectra confirm the proposed structure

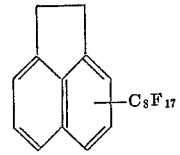

Calculated for $C_{20}H_9F_{17}$: 42.0% C, 56.7% F. Found: 41.3% C, 56.4% F.

| NMR SPECTRAL DATA ||||
|---|---|---|---|
| $H^1$ | Description | $F^{19}$ | Position on sidechain |
| 2.54 | Multiplet, aromatic protons | 80.8 φ | 8 |
|  |  | 105.8 φ | 1 |
| 6.65 | Singlet, alkylene protons | 120.7 φ | 2–6 |
|  |  | 125.5 φ | 7 |

| IR SPECTRAL DATA |||
|---|---|---|
| —$CH_2$— | Aromatic H | C—F |
| 3.42 | 6.25 | 7.75–8.9 |
|  | 6.65 |  |
|  | 7.02 |  |

*Example 2*

Indene, 11.6 g. (0.1 mole) and $C_8F_{17}SO_2Cl$, 51.8 g. (0.1 mole) are charged to a 250 ml. quartz flask fitted with a stirrer, a condenser, a liquid air trap and a drying tube. The reaction mixture is heated with stirring at 120° C. while exposing it to a Hanovia U.V. lamp for 6 hours.

Fractional distillation of the reaction mixture gives as the main fraction 20.5 g. (38%) of a light yellow liquid.

Calculated for $C_{17}F_{17}H_7$: C, 38.2%; F, 60.5%. Found: C, 37.2%; F, 58.7%.

Infrared and Nuclear Magnetic Resonance spectra are consistent with the proposed structure

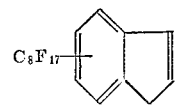

Substitution of $C_8F_{17}SO_2Br$ for the $C_8F_{17}SO_2Cl$ in the foregoing reaction with indene produces the identical perfluorooctane-substituted indene derivative.

The $C_8F_{17}SO_2Br$ is produced as follows: To 201 grams (0.4 mol) of perfluorooctanesulfonyl fluoride in a three-necked flask is added 152 grams (1.2 mol) of sodium sulfite, 50 grams of dioxane and 150 grams of water. The mixture is heated for 5 hours at 85–87° C. while a slow stream of nitrogen gas is bubbled through the reaction mixture. No foaming is observed. The product is recovered by adding 600 ml. of isopropyl alcohol, warming to 70° C., then filtering and re-extracting the precipitate twice with additional portions of hot isopropyl alcohol. The isopropyl alcohol, water and dioxane are removed in vacuo from the sodium perfluorooctane sulfinate (85% yield).

Bromination with bromine in carbon tetrachloride produces the perfluorooctanesulfonyl bromide in the following manner: To 70 grams of sodium perfluorooctane sulfinate in 300 ml. of carbon tetrachloride is added 21 grams of bromine drop-wise at room temperature until no further bromine reaction is observed. The reaction mixture is then filtered and the carbon tetrachloride removed by distillation. The residue is recrystallized from dichloromethane to give 44 grams of perfluorooctanesulfonyl bromide (48% yield, M.P. 40–42° C.).

*Example 3*

Additional embodiments of the process of the invention using unsubstituted aromatic compounds are given in Tables I and II. The algebraic sum of the sigma (para) Hammett values for the groups in the aromatic compounds listed therein is zero in every case. Each of these reactions is carried out in a flask fitted with a condenser, a receiver, a liquid air or Dry Ice trap and a drying tube. At the end of the reaction the product remains in the flask while the $SO_2$ and HCl collect in the trap.

TABLE I.—CHARGE AND REACTION

| Lot No. | Charge | | $C_8F_{17}SO_2Cl$, Amt., gms. | Reaction Conditions | |
|---|---|---|---|---|---|
| | Aromatic Compound | Amt., gms. | | Temp., °C. | Time, Hours |
| A | 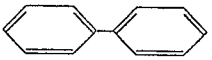 | 15.4 (.1M) | 51.8 (1M) | 170 180 187 | 1 2 2 |
| B |  | 23 (.1M) | [2a] 51.8 (.1M) | 165 | 2 |
| C | 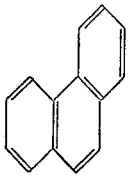 | 17.8 (.1M) | 51.8 (.1M) | [1] 120 | 22 |
| D | 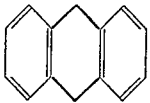 | 16.8 (.1M) | 51.8 (.1M) | 170 | 1 |
| E | 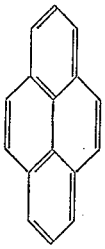 | 20.2 (.1M) | [2c] 51.8 (.1M) | 165 | 2 |
| F | 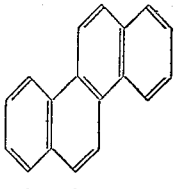 | 11.4 (0.05M) | [2a] 25.9 (0.05M) | 150 | 3 |
| G |  | 64 (0.5M) | [2b] 284 (0.55M) | 165 | 26 |
| H | 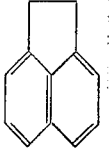 | 13 (0.1M) | 51.8 (0.1M) | [1] 120 | 21.5 |
| I | 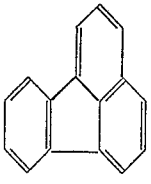 | 20.2 (.1M) | 51.8 (1M) | [3] 170 | 3 |

[1] Reaction in presence of U.V. lamp using quartz flask.
[2] O-Dichlorobenzene charged to flask with reactants as follows: a 50 ml., b 100 ml., c 150 ml.
[3] System swept with nitrogen before heating to reaction temperature.

TABLE II.—RECOVERY AND CHARACTERIZATION OF PRODUCT

| Lot No. | Recovery Procedure | Yield | Product | |
|---|---|---|---|---|
| | | | Appearance | Characterization |
| A | Fractional crystallization of pot bottoms from $C_2F_5C_6F_{11}$. | Crude 25% | Light tan waxy solid | IR spectrum consistent with proposed structure. |
| B | Pot bottoms extracted with $C_6F_{18}$ and recrystallization from benzene. | Crude 25% | | M.p., 175–195°. |
| C | Pot bottoms sublimed | Crude 35% | Light yellow mushy solid to yellow viscous liquid. | Calc. for $C_{22}H_9F_{17}$: C, 45.7; F, 54.2. Found: C, 45.7; F, 53.2. |
| D | Pot bottoms recrystallization from $C_2F_5$-$C_6F_{11}$. | Crude 80% | Solid m.p. 95–140° C. and (impure viscous brown oil). | |
| E | Low boilers removed, remaining solid extracted with EtOH, EtOH-insoluble material digested in hexane and filtered hot. Filtrate concentration gave 3 crops. Best product crop 1. | Crude above 50% | | Best product m.p. 127–132° C. Infrared consistent with proposed structure. |
| F | Pot residue cooled to room temperature and filtered. Filtrate steam distilled leaving the product. | 45% | Yellow solid | Infrared spectrum consistent with proposed structure. |
| G | Volatiles removed from pot residue, remainder fractionally distilled. | 76% | Colorless solid | B.p. 100–105°$_{0.1\,mm}$. Infrared confirms proposed structure. |
| H | Reaction mixture fractionally distilled. | 40% | Light yellow, waxy | B.p. 140–152° C./1.2 mm. Calc. for $C_{20}H_9F_{17}$: C, 42.0%; F, 56.7%. Found: C, 41.3%; F, 56.4%. Infrared and NMR consistent with proposed structure. |
| I | Reaction mixture extracted with $C_2F_5C_6F_{11}$; best sample soluble hot, insoluble at room temperature. | Crude 30% | Yellow solid | Best sample m.p. 70–80° C. |

*Example 4*

Tables III and IV give several lots according to the process of the invention using phenols and naphthols as the aromatic compounds. The apparatus in these runs is the same as in Example 3.

TABLE III.—CHARGE AND REACTION

| Lot No. | Aromatic Compound | | | $C_8F_{17}SO_2Cl$ Amt., gms. | Reaction Conditions | |
|---|---|---|---|---|---|---|
| | Structure | Hammett Values [1] | Amt., gms. | | Temp. ° C. | Time, Hrs. |
| A | 4-chlorophenol (OH, Cl) | −0.357 (OH)<br>+0.23 (Cl)<br>−0.13 | 12.8 (.1M) | [2a] 51.8 (.1M) | 165 | 51½ |
| B | resorcinol (OH, OH) | −0.71 | 11.0 (.1M) | [2b] 51.8 (.1M) | Reflux | 2½ |
| C | hydroquinone (OH, OH) | −0.71 | 55.0 (.5M) | [2d] 285 (.55M) | Reflux | 20 |
| D | 4-chloro-1-naphthol (OH, Cl) | −0.357 (OH)<br>+0.23 (Cl)<br>−.13 | 17.8 (.1M) | [2b] 51.8 (.1M) | 165 | 3 |

TABLE III.—CHARGE AND REACTION—Continued

| Lot No. | Aromatic Compound | | | $C_8F_{17}SO_2Cl$ Amt., gms. | Reaction Conditions | |
|---|---|---|---|---|---|---|
| | Structure | Hammett Values [1] | Amt., gms. | | Temp. °C. | Time, Hrs. |
| E | (naphthalen-1-ol, OH) | −0.357 | 14.4 (.1M) | [2a] 57 (.11M) | 165 | 3½ |
| F | (naphthalen-2-ol, OH) | −0.357 | 14.4 (.1M) | [2c] 56.9 (.1M) | Reflux | 2 |
| G | HO—C₆H₄—C(CH₃)₂—C₆H₄—OH | [3] −0.126<br>−0.357 (OH)<br>———<br>−0.483 | 22.8 (.1M) | [2c] 56.9 (.1M) | 165 | 3¼ |
| H | (8-hydroxyquinoline) | −0.357 (OH)<br>+0.06 (ring N)<br>———<br>−0.417 | 14.5 (.1M) | 51.8 (.1M) | [4] 130 | 1½ |

[1] Algebraic sum of Hammett sigma (para) parameters for substituent groups about a single ring system.
[2] O-dichlorobenzene charged to flask with reactants as follows:
  [a] 50 ml., [b] 100 ml., [c] 150 ml., [d] 250 ml.
[3] This is the value for $C_3H_7$. The substituent group here would have approximately the same value.
[4] Reaction in presence of U.V. lamp using quartz flask.

TABLE IV.—RECOVERY AND CHARACTERIZATION OF PRODUCT

| Lot No. | Recovery Procedure | Yield, percent | Product | |
|---|---|---|---|---|
| | | | Appearance | Characterization |
| A | Reaction mixture steam distilled. Non-volatiles in reaction mixture fractionally distilled. | 19 | Yellow solid | B.p. 91–96° C./0.9 mm. Calc. for $C_{14}F_{17}H_4OCl$: C, 30.8; F, 59.2. Found: C, 30.8; F, 57.8. |
| B | Steam distillation, vacuum distillation of crude reaction product, product in cut 1 of the vacuum distillation. | 19 | Orange, viscous liquid. | B.p. 98–114° C./0.15 mm. Infrared positive for desired product. |
| C | Cool, filter, fractional crystallization from heptane. | 33 | Soft, yellow solid | Calc. for $C_{14}F_{17}H_5O_2$: C, 31.8; F, 61.2. Found: C, 31.7; F, 62.2. Infrared confirms structure of desired product. |
| D | Steam distillation, fractional distillation of pot residue. | 9 | Yellow solid | B.p. 115–132° C./0.1 mm. Calc. for $C_{18}F_{17}H_5OCl$: C, 36.2; F, 54.3. Found: C, 35.9; F, 51.2. |
| E | Insolubles in reaction mixture fractionally distilled, cut boiling at 140–145°/0.39–0.45 mm. crystallize from hexane. | 12 | Soft orange colored crystals. | Calc. for $C_{18}F_{17}H_7O$: C, 38.5; F, 57.5. Found: C, 38.2; F, 56.4. |
| F | Steam distillation pot residue sublimed | 30 | Viscous yellow liquid | Calc. for $C_{18}F_{17}H_7O$: C, 38.4; F, 57.5. Found: C, 38.9; F, 57.1. |
| G | Steam distillation, water insoluble pot residue taken up in benzene, then stripped at reduced pressure. | 85 | Viscous orange residue which slowly crystallized. | Calc. for $C_{23}H_8F_{17}O_2$: C, 43.2; F, 50.5; OH Equiv., 319. Found: C, 43.6; F, 48.5; OH Equiv., 301. |
| H | Steam distillation, product collected from distillate of steam distillation. | | Yellow solid | Infrared indicates that the product is a salt of the desired product m.p. 145–160° C. |

Example 5

Tables V and VI show several embodiments of the invention using various other aromatic compounds. The apparatus in each is again the same as in Example 3.

TABLE V.—CHARGE AND REACTION

| Lot No. | Aromatic Compound | | Amt., gms. | $C_8F_{17}SO_2Cl$ Amt. gms. | Reaction Conditions | |
|---|---|---|---|---|---|---|
| | Structure | Hammett Values [4] | | | Temp., °C. | Time, Hours |
| A | (diphenyl ketone) | +0.459 $\left(-\overset{O}{\underset{\|}{C}}-\bigcirc\right)$ | 18.2 (.1M) | [2][b]51.8 (.1M) | Reflux | 72 |
| B | (diphenyl ether) | −0.028 $\left(-O-\bigcirc\right)$ | 17.0 (.1M) | [2][c]56.9 (.11M) | Reflux | 48 |
| C | (diphenyl sulfide) | Approx. +0.2 | 18.6 (.1M) | [2][b]51.8 (.1M) | Reflux | 12 |
| D | (diphenylamine) | Approx. −0.3 | 16.9 (.1M) | [2][c]51.8 (.1M) | Reflux | 3 |
| E | 2,6-dimethylnaphthalene | −0.34 | 15.6 (.1M) | [2][c]56.9 (.11M) | Reflux | 3¼ |
| F | quinoline | −0.06 | 12.9 (.1M) | 51.8 (.1M) | [1] 110 | 24 |
| G | 1-chloro-4-methoxynaphthalene | +0.23 (Cl) −0.27 (OCH₃) −0.04 | 27 (.14M) | 10.0 (.02M) | 165 | 8 |

[1] Reaction in presence of U.V. lamp using quartz flask.
[2] O-dichlorobenzene charged to flask with reactants as follows: [b] 100 ml., [c] 150 ml., [e] 75 ml.
[4] Algebraic sum of Hammett sigma (para) parameters for substituent groups about a single ring system.

TABLE VI.—RECOVERY AND CHARACTERIZATION OF PRODUCT

| Lot No. | Recovery Procedure | Yield, percent | Product | |
|---|---|---|---|---|
| | | | Appearance | Characterization |
| A | Steam distillation, water insoluble pot residue heated over steam bath to remove volatiles, cooled and filtered, both precipitate and filtrate are product. | [1] 55 | Two portions: a soft, tan solid and a viscous orange liquid which was slowly crystallizing. | Infrared indicated C—F and C=O bonds. |
| B | Steam distillation to remove solvent pot residue fractionally distilled. | 40 | Colorless liquid | B.p. 120-3°/.3 mm. $n_D^{25.8}$=1.4170. Infrared confirms structure of the expected product. |
| C | Steam distillation, pot residue fractionally distilled. | 23 | | B.p. 133-166°/.3 mm. Calc. for $C_{20}F_{17}H_9S$: C, 39.7; F, 53.4. Found: C, 40.0; F, 49.2. |
| D | Steam distillation, water insoluble pot residue dried by dissolving in water and azeotroping water, benzene evaporated and the residue digested in heptane and filtered, heptane evaporated from filtrate to leave product. | 65 | Colored oil | Calc. for $C_{20}F_{17}H_{10}N$: C, 40.8; F, 54.9. Found: C, 39.6; F, 54.5. Infrared confirms the expected structure. |
| E | Steam distilled, water insoluble pot contents decolorized and crystallized from heptane. | 36 | Cream colored solid | M.p. 50-70° C. Infrared spec. consistent with desired product. |
| F | Reaction mixture stripped at reduced pressure, residue distilled, and the bottoms of the distillation were fractionally crystallized, best product fraction 1 of the crystallization. | 11 | Brown solid | Infrared spec. indicates desired product. |
| G | Fractional distillation | | | Cuts boiling at 60-63°/1.0 mm. and 58-62°/1.0 mm. Infrared indicates desired product. |

Additional aromatic compounds which are also reactive with perfluoroalkanesulfonyl chlorides in accordance with the principles of this invention together with the algebraic sum of Hammett sigma (para) parameters for each are:

| Compound | Hammett Values |
| --- | --- |
| benzene | 0 |
| 2,4-dihydroxybenzophenone | −0.71 (two OH)<br>+0.46 (−CO−)<br>−−−−−−−<br>−0.25 |
| pyrogallol (1,2,3-trihydroxybenzene) | −1.1 |
| 5-nitroacenaphthene | +0.78 (NO$_2$) |
| 4-methoxy-1-naphthol | −0.63 |
| acetanilide | −0.015 |
| 1,2-dichlorobenzene | +0.525 (two Cl) |
| 1-trichlorosilylnaphthalene | Less than +0.8 |
| 4-bromonaphthalic anhydride (methoxy naphthalene anhydride) | +0.65 [1] |
| 1,4-dimethoxybenzene | −0.54 |

[1] This value is the Hammett value of the anhydride group. An infrared technique developed by M. St. C. Flett was used to determine it. This technique is discussed in *Trans. Faraday Soc.* 44, 767 (1948) and referred to by Jaffe. *Chem. Rev.* 53, 214 (1953).

Thus each of these compounds either contains at least one benzene ring having at least one available hydrogen atom thereon and in which the algebraic sum of the Hammett sigma (para) parameters of the substituents thereon is not greater than about +0.5 or contains at least one fused ring system including a six-membered carbocyclic ring which has at least one available hydrogen atom thereon and in which the algebraic sum of the Hammett sigma (para) parameters of the substituents on said ring system is not greater than about +0.8. On the other hand, aromatic compounds which do not conform to either of these two classes have been found to be inoperable for the purposes of the invention. One such compound is ethylbenzoate, the Hammett value for the substituent —CO$_2$C$_2$H$_5$ being +0.522. Another is 4-bromonaphthalic anhydride, the Hammett value for the anhydride group being +0.65 and that for —Br being +0.23.

What is claimed is:
1. The process for introducing perfluorocarbon groups directly onto aromatic carbocyclic rings in organic compounds which comprises heating at from about 100° to 225° C. and under free radical conditions a mixture of
   (1) a compound which contains an aromatic carbocycle with available hydrogen thereon, said carbocycle being selected from the class consisting of
      (a) a benzene ring, the algebraic sum of the Hammett signa (para) parameters of the substituents on said benzene ring being not greater than about +0.5, and
      (b) a six-membered aromatic ring which is part of a fused ring system, the algebraic sum of the Hammett sigma (para) parameters of the substituents on said ring system being not greater than about +0.8, and
   (2) a perfluorocarbonsulfonyl halide selected from the class consisting of perfluorocarbonsulfonyl chlorides and perfluorocarbonsulfonyl bromides having 1 to 18 carbon atoms in the molecule
until substantial reaction has occurred and recovering the perfluorocarbon-substituted aromatic compound from the reaction mixture.

2. The process which comprises heating at from about 100° to 225° C. and under free radical conditions a mixture of
   (1) an organic aromatic compound containing a benzene ring having at least one available hydrogen atom thereon and in which the algebraic sum of the Hammett sigma (para) parameters of the substituents on said ring is not greater than about +0.5 and
   (2) a perfluorocarbonsulfonyl halide selected from the class consisting of perfluorocarbonsulfonyl chlorides and perfluorocarbonsulfonyl bromides having 1 to 18 carbon atoms in the molecule
until substantial reaction has occurred and recovering from the resulting reaction mixture a perfluorocarbon-substituted aromatic compound having the perfluorocarbon group bonded directly to the benzene ring.

3. The process which comprises heating at from about 100° to 225° C. and under free radical conditions a mixture of
   (1) an organic aromatic compound containing a fused ring system including a six-membered aromatic carbocyclic ring which has at least one available hydrogen atom thereon and in which the algebraic sum of the Hammett sigma (para) parameters of the substituents on said ring system is not greater than about +0.8 and
   (2) a perfluorocarbonsulfonyl halide selected from the class consisting of perfluorocarbonsulfonyl chlorides and perfluorocarbonsulfonyl bromides having 1 to 18 carbon atoms in the molecule
until substantial reaction has occurred and recovering from the reaction mixture a perfluorocarbon-substituted aromatic compound having the perfluorocarbon group bonded directly to the six-membered aromatic carbocyclic ring.

4. The process of claim 1 wherein the perfluorocarbonsulfonyl halide is a perfluorocarbonsulfonyl chloride.

5. The process of claim 2 wherein the perfluorocarbonsulfonyl halide is a perfluorocarbonsulfonyl chloride.

6. The process of claim 3 wherein the perfluorocarbonsulfonyl halide is a perfluorocarbonsulfonyl chloride.

7. The process of claim 1 wherein the perfluorocarbonsulfonyl halide is perfluorooctanesulfonyl chloride.

8. The process of claim 1 wherein the organic aromatic compound is unsubstituted and the algebraic sum of the Hammett sigma (para) parameters of the substituents on the aromatic ring systems thereof is zero.

9. The process of claim 1 wherein the organic aromatic compound is an ether.

10. The process of claim 1 wherein the organic aromatic compound contains a nitrogen heterocycle.

11. The process of claim 1 wherein the organic aromatic compound contains halo substitution.

12. The process of claim 3 wherein the organic aromatic compound has a halosilane substituent.

No references cited.

ALEX MAZEL, *Primary Examiner.*

DONALD G. DAUS, *Assistant Examiner.*